United States Patent [19]

Eilenstein-Wiegmann et al.

[11] Patent Number: 5,312,071
[45] Date of Patent: May 17, 1994

[54] DEVICE FOR PROTECTING A DOOR SILL, ESPECIALLY IN A LOADING OPENING OF AN AIRCRAFT

[75] Inventors: Wilfried Eilenstein-Wiegmann, Stuhr; Guenter Vogg, Bremen, both of Fed. Rep. of Germany

[73] Assignee: Deutsche Aerospace Airbus GmbH, Hamburg, Fed. Rep. of Germany

[21] Appl. No.: 39,814

[22] Filed: Mar. 29, 1993

[30] Foreign Application Priority Data

Mar. 28, 1992 [DE] Fed. Rep. of Germany ....... 4210303

[51] Int. Cl.⁵ .............................................. B64C 1/22
[52] U.S. Cl. .................................................. 244/137.1
[58] Field of Search ............... 244/137.1, 118.1, 118.3; 414/532, 533, 534, 535; 105/392; 14/69.5, 71.1, 71.5; 114/72; 193/35 R; 198/861.1, 861.3

[56] References Cited

U.S. PATENT DOCUMENTS

| | | | |
|---|---|---|---|
| Re. 23,079 | 1/1949 | Woldring et al. | 193/35 R |
| 2,199,097 | 4/1940 | Chappelle | 193/35 R |
| 4,000,870 | 1/1977 | Davies | 244/137.1 |
| 5,172,804 | 12/1992 | Chersin | 198/861.3 |

*Primary Examiner*—Michael S. Huppert
*Assistant Examiner*—Anne E. Bidwell
*Attorney, Agent, or Firm*—W. G. Fasse; W. F. Fasse

[57] ABSTRACT

The door sill of a cargo loading and unloading opening in an aircraft body is protected against damage by a cover plate that is hinged to the loading floor alongside the door opening to be tiltable outwardly to cover the sill when in the operative position. The outwardly pointing edge of the cover plate is supported by a support linkage, including a support link or section and a tie rod or bracing link, which are pivoted to the cover plate and to each other, so that the plate and its support linkage may be tilted into a recessed position in which the plate with its support linkage extends substantially in parallel and close to the door or gate that closes the cargo opening, thereby using very little space in the stowed condition.

11 Claims, 3 Drawing Sheets

DEVICE FOR PROTECTING A DOOR SILL, ESPECIALLY IN A LOADING OPENING OF AN AIRCRAFT

FIELD OF THE INVENTION

The invention relates to a device for covering and protecting a door sill of a door opening in an aircraft body leading into a cargo hold of the aircraft body. Normally, the opening is closed by a door or gate.

BACKGROUND INFORMATION

Devices of this kind are used in order to facilitate the loading or unloading of the cargo hold of an aircraft. For this purpose, the covering device bridges an area of the loading opening which is normally closed or covered by the door or gate. This door sill area is interfering with the proper movement of cargo pieces across the door sill due to the construction of the door sill required for a tight closing of the aircraft door. Damage to the door sill must definitely be avoided because it prevents the proper closing or at least the tight closing of the door. The present device is intended to prevent such damage.

Known devices for this purpose are capable of satisfactory service for the bridging requirement and the protection requirement. However, known structures are bulky and thus require a substantial space for their storage when they are not used for the intended purpose. During flight, these devices must be stored in the cargo hold and thus are taking up valuable cargo space which interferes with an optimally efficient utilization of the cargo space for pieces of cargo. Additionally, known structures of this type have the drawback that they do not satisfy all requirements for a simple handling and installation.

OBJECTS OF THE INVENTION

In view of the above it is the aim of the invention to achieve the following objects singly or in combination:

to provide a device for the protection of an aircraft door sill, especially of an opening leading into a cargo hold of an aircraft in such a way that in its folded-away state the device takes up little space, that it is easily handled, and that it can be deployed by a pulling force directed outwardly toward the door opening;

to assure the adequate protection of the door sill when the device is in its extended operative state;

to make sure that the device automatically takes up an exact position in its deployed state; and to construct the device in such a manner that it can be permanently installed next to the door to take up a recessed position in parallel to the door when the latter is closed, and to be pulled into the deployed position when the door is opened.

SUMMARY OF THE INVENTION

The device according to the invention is characterized by a cover plate having an inward edge journalled to the aircraft floor structure by at least one hinge, and an outward edge to which a support linkage is journalled in such a way that in the retracted condition of the cover plate, the support linkage is also retracted and in the extended position the support linkage braces the extended cover plate by at least one support leg against the aircraft body structure in a releasable manner. Preferably, the support linkage includes a leg section and a bracing section pivoted or journalled to each other and to the cover plate in such a manner that the journal or pivot between the bracing section and the cover plate is positioned with an outward spacing from the hinge that secures the plate to the loading floor.

The combination of the cover plate with the support linkage including the tie rod or bracing section, and the arrangement of the journal hinges, makes it possible to construct the present device in such a way that in its withdrawn, not used position, the plate can assume an almost vertical position or its inclination to the vertical is very small, whereby bringing the plate into the horizontal use position merely requires applying a horizontally outwardly directed pulling force to the plate thereby tilting the plate downwardly to bridge the door sill.

By coupling or hinging or pivoting the support link section to the cover plate and by pivoting the bracing section to the support section and to the cover plate, it is assured that the lower end of the support link forming a support leg, is exactly positioned when the plate is in its horizontal attitude. Thus, the lower end of the support link can be readily and releasably inserted into a socket or the like. Additional alignment operations are thereby obviated because all required alignments takes place automatically by the defined interconnection of the support linkage sections with the cover plate.

When the loading or unloading is completed, the present cover plate is simply brought back into its substantially upright position by lifting the plate, whereby the support link or leg section and the bracing link or tie rod tilt toward the plate so that in the unused position the support linkage including the tie rod extend substantially parallel to each other and include with the cover plate an acute angle, thereby forming the sides of a triangle, the base of which is formed by the distance between the journal axis of the hinge connecting the plate to the floor and by the journal axis of the pivot joint connecting the bracing link to the plate. Due to the above mentioned acute angle between the plate and the support link, a very compact arrangement is provided when the device is in its inwardly tilted storage position. As a result, the device may be arranged in a stationary location in front of the door and permanently connected to the floor structure. This feature avoids the drawback of conventional structures which are merely temporarily arranged in the area of the loading door or opening and then must be stowed away wherever there is space once the loading or unloading operations have been completed. The temporary installation of conventional devices requires a substantial effort and expenditure of manpower which is avoided by the invention.

By pivoting or journalling the bracing link to the plate between the hinge of the cover plate and the aircraft outer wall, the support and bracing linkage becomes simple in itself and simple in its manual operation. Additionally, this arrangement of the bracing link pivot results in a compact structure that can be retracted into the cargo hold right alongside the door where its stowing requires but little space.

Disadvantageous lever forces may be avoided or at least minimized by securing the lower end of the support link in a releasable manner in a support bearing, preferably in the form of a socket in which a ball-shaped foot of the support link is received for holding the plate in its operative position.

A suitable mechanical advantage is achieved when the tie rod or bracing link is provided with a knee bend to accommodate the relevant aircraft dimensions in the area of the door opening.

The pushing of a load onto the cover plate is facilitated by providing the outwardly facing edge of the cover plate with guide rollers. Additionally, transport elements, such as ball mats or tiltable rollers may be incorporated into the cover plate.

The main hinge that connects the cover plate to the floor structure is preferably constructed as two arms or extensions of the cover plate through which a hinging shaft or bolt extends that hinges the arms to the floor structure either directly or through a mounting member, which in turn is secured, for example to a support rail in the floor structure.

In order to accommodate different aircraft dimension by substantially the same cover device, it is preferable that the lower end of the support link with its connecting member is adjustable, for example, in a telescoping manner, whereby the length of the support link may be adjusted as required.

The mounting of the device is substantially facilitated by the above mentioned mounting member which itself is easily secured to a support rail in the loading floor structure.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
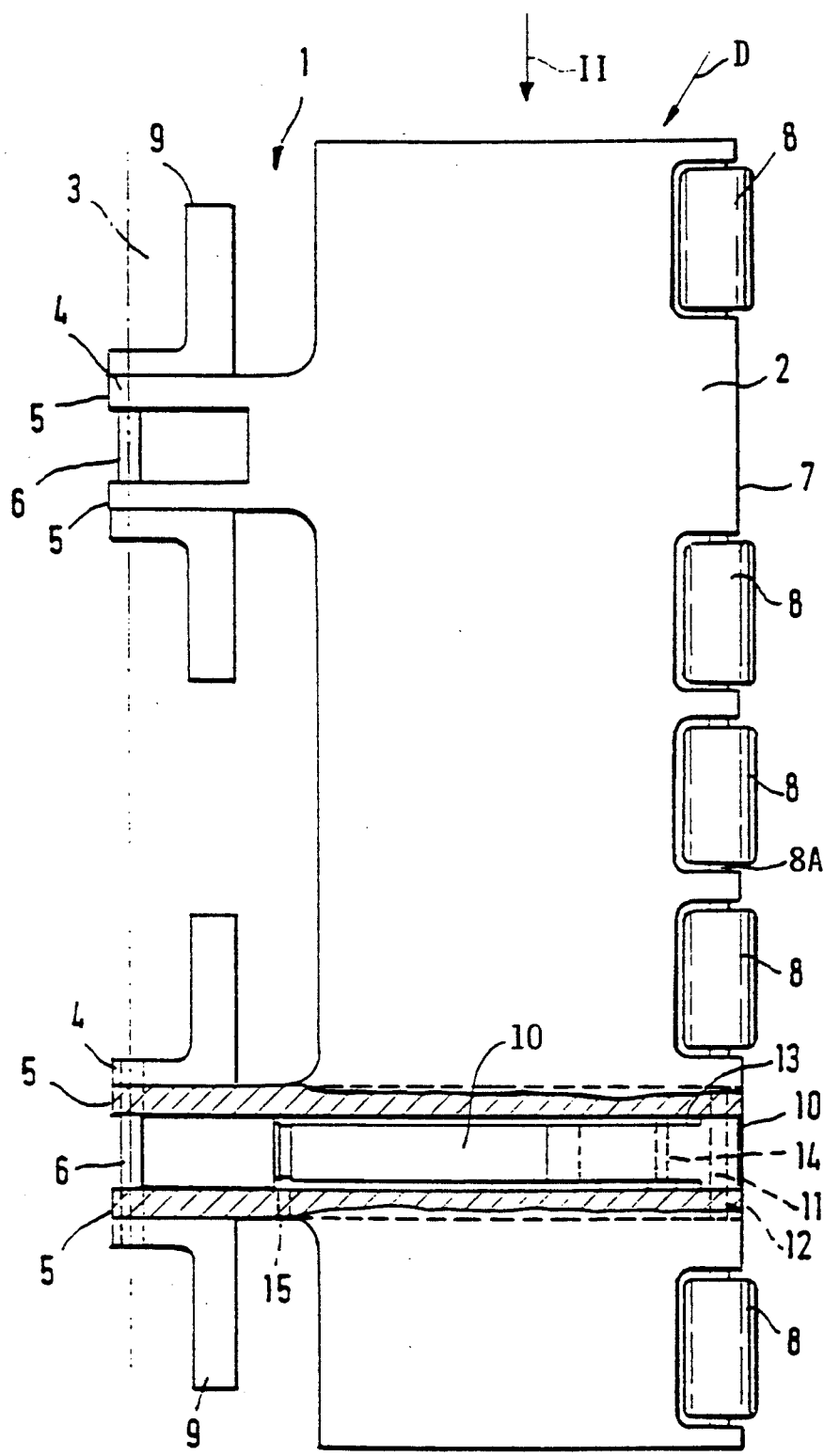
FIG. 1 is a top plan view of a cover device according to the invention.
Figure 2:
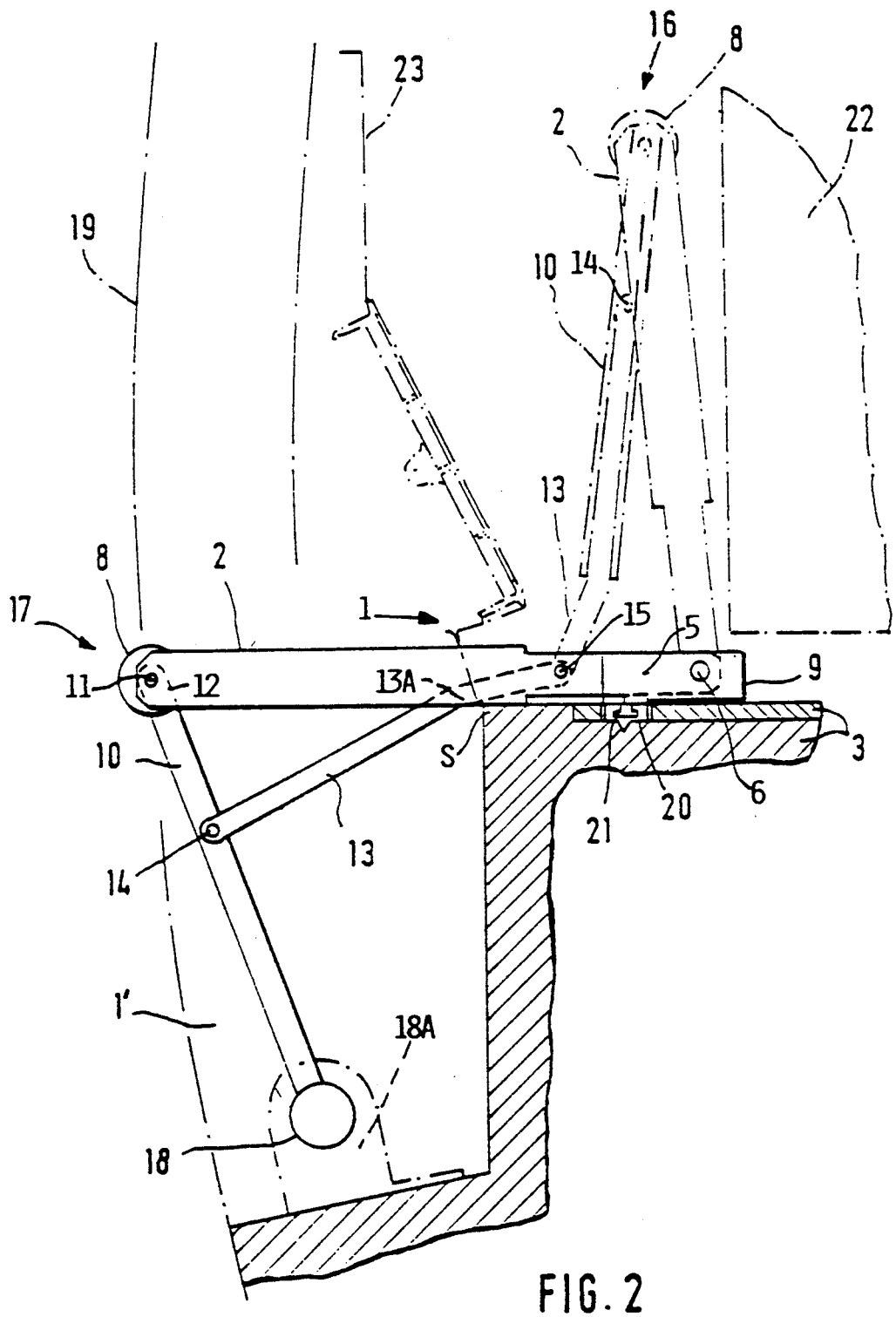
FIG. 2 is an end view partially in section, substantially in the direction of the arrow II in FIG. 1, whereby the full lines illustrate the cover in its operating position, while the dash-dotted lines illustrate the stowed position.

Referring to FIGS. 1 and 2 in conjunction, the present device D comprises a cover plate 2 for bridging a sill 1 of a loading and unloading opening in a body 19 of an aircraft. The cover plate 2 is hinged to a loading floor structure 3 of the aircraft body 19 shown by dash-dotted lines in FIG. 2. Two hinges 4 are shown in FIG. 1. Each hinge comprises two hinge arms 5 preferably integral part of the cover plate 2 and hinged to a mounting bracket 9 by a respective hinge pin 6. Normally, two such hinges will be used for each cover plate 2. However, depending on the length of the cover plate 2, three or more hinges may be used for each cover plate 2.

The use of mounting brackets 9 facilitates the manufacture and the securing of the hinges 2 to the loading floor 3. However, the present device can easily be secured to the loading floor without such mounting brackets 9. The brackets, however, facilitate the mounting since the brackets are easily secured to longitudinal rails 20 conventionally installed in the loading floor 3 as shown in FIG. 2. The brackets may be inserted with mounting feet 21 into the respective slots of the mounting rails 20.

As shown in FIG. 1 the outwardly facing edge 7 of the cover plate 2 is equipped with guide rollers 8 supported on roller axles 8A in the outward edge 7. In addition to the rollers 8, the plate 2 may be equipped with rotatably mounted bearing balls for supporting a load 22 rolling over the cover plate 2. The bearing balls will slightly project over the upward surface of the plate 2.

Referring to FIG. 2, the plate 2, or rather its outwardly facing edge 7 with its rollers 8 is supported by a support linkage comprising a leg section 10, a bracing section or tie rod 13, and pivots or journals mounting the support linkage to the cover plate 2. A journal or pivot 11 secures the upper end of the support or leg section 10 to the edge of the plate 2. A pivot or journal 15 secures the upper end of the brace section 13 to the plate 2 at a location between the hinge axis 6 and the journal 11. Preferably, the spacing between the hinge axis 6 and the journal 15 is smaller than the spacing between the journal 15 and the journal 11. The journal 11 should be located as close to the edge 7 of the plate 2 as possible to provide the best support mechanical advantage. The journal 11 may be constructed as a groove 12 in the edge 7 of the plate 2, whereby the groove faces substantially downwardly and receives the correspondingly shaped upper end of the support link or leg 10. The lower end of the bracing section 13 is pivoted or journalled to the support section 10 by a pivot 14. The support section 10 and the brace 13 are received in a recess 1' in the aircraft body 19. The support section 10 is also connected indirectly to the mounting bracket 9 by the bracing section 13 which in turn is connected through the journal 15 to the bracket 9 and thus to the loading floor 3. The journals 14 and 15 are preferably formed as simple journal pins received in respective bores.

Referring to FIG. 2, the full line position illustrates the elements of the present device in their working sill bridging position 17 while the dash-dotted lines illustrate the device in the stowed position 16. The lower end of the support section 10 is provided with a foot 18, such as a ball removably or releasably received in a fixed ball socket 18A which is secured to the aircraft body. Preferably, the foot 18 is adjustable, for example, by a telescopic construction of the support section 10 so that the same bridging device can be used to accommodate different aircraft dimensions and different curvatures of the aircraft body in the longitudinal and circumferential directions. Thus, it is possible to construct the present device of standardized components which are easily adapted to the requirements of individual aircraft types. Instead of constructing the support section 10 as a telescoping member, a simpler construction would merely involve a plurality of adjustment holes along the lower length of the support section 10, whereby the foot 18 would be connectable to any one of the holes. After installation, any excess length is easily cut off.

As mentioned above, the mounting member 9 is preferably secured to the loading floor 3 with the help of the support rail 20 into which mounting elements 21 of the mounting member 9 grip.

The dash-dotted lines in FIG. 2 show that the present device in its stowed position 16 requires a mininmal space between the symbolically shown loading door 23 and a piece of freight 22, such as a container.

FIG. 2 further shows that the tie rod or bracing section 13 has a knee bend 13A which has the advantage that the horizontal spacing between the journals 15 and the hinge pin 6 can be reduced, thereby making the device still more compact in the folded position. Another advantage of this feature is seen in that a portion of the cover plate with its hinge arms 5 is supported by the aircraft body 3 to the right of the door sill edge S with an improved mechanical advantage.

Figure 3:
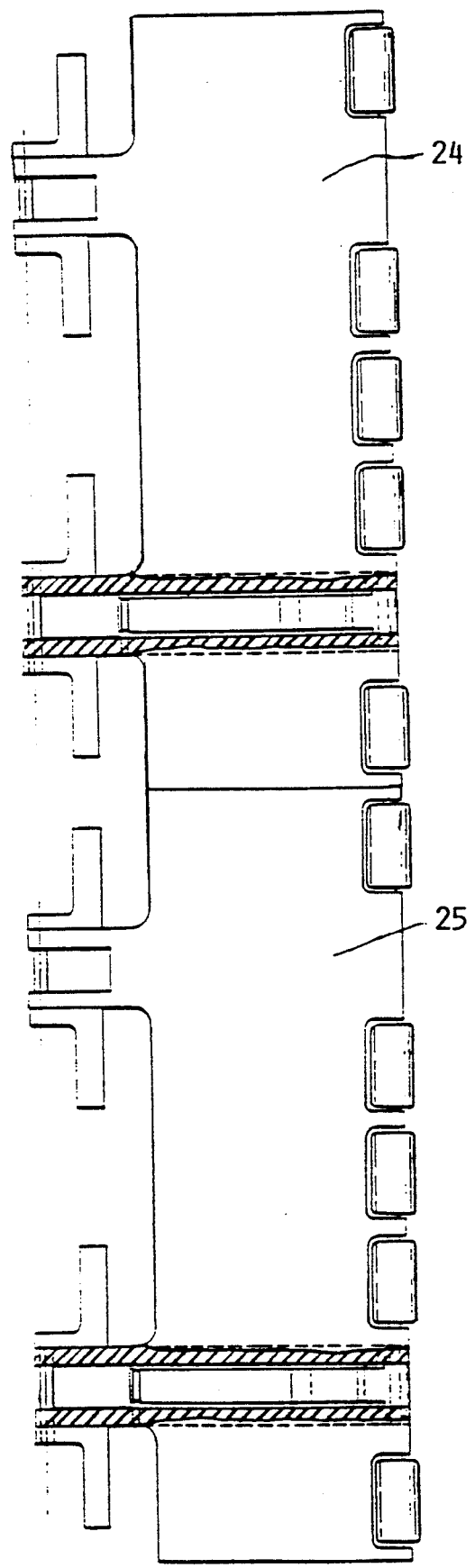
FIG. 3 is a view similar to that of FIG. 1, but showing two cover plates arranged in a row.

The present device is also suitable to be divided into several separate sections 24, 25, whereby each becomes easily manually operable and whereby these sections are placed in a row parallel to the longitudinal aircraft axis as shown in FIG. 3.

Although the invention has been described with reference to specific example embodiments, it will be appreciated that it is intended to cover all modifications and equivalents within the scope of the appended claims.

What I claim is:

1. A device for covering and protecting a door sill of an opening leading into an aircraft body, comprising a cover plate, at least one hinge connecting an inner first edge of said cover plate to a floor of the aircraft, and a support linkage for supporting an outward second edge of said cover plate, said support linkage including a support section (10), a bracing section (13), a first journal (11) connecting said outward second edge of said cover plate to said support section, a second journal (15) connecting said bracing section to said cover plate, and a third journal (14) connecting said bracing section (13) to said support section (10), said support section (10) comprising a foot (18) for releasably cooperating with a holding member (18A) secured to said aircraft body, and wherein a spacing is provided between said second journal (15) and said at least one hinge, said spacing being just sufficient to permit folding said support linkage toward a back side of said cover plate when said cover plate is in a stowed position.

2. The device of claim 1, wherein said second journal (15) is arranged between said hinge (6) and said outward edge (7) of said cover plate (2).

3. The device of claim 1, wherein said bracing section (13) of said support linkage comprises a knee bend (13A) along its length for bringing said second journal (15) closer to said hinge.

4. The device of claim 1, further comprising guide rollers (8) arranged lengthwise along said outward edge (7) of said cover plate (2) for guiding a load passing over said cover plate.

5. The device of claim 1, wherein said at least one hinge comprises two hinging arms (5) and a hinge pin (6) securing said cover plate to said floor (3) of said aircraft.

6. The device of claim 1, comprising at least two cover plates arranged in a row in parallel to a longitudinal aircraft axis.

7. The device of claim 1, wherein said foot (18) of said support section of said support linkage is adjustably positioned along a lower end of said support section (10).

8. The device of claim 1, wherein said at least one hinge comprises a hinge pin (6) and a mounting member (9) for mounting said hinge pin to said floor (3), said mounting member comprising holding elements (21) locked into a support rail (20) in said floor (3) of said aircraft.

9. The device of claim 1, wherein said floor is a loading floor in a cargo hold of the aircraft.

10. A device for covering and protecting a door sill of an opening leading into an aircraft body, comprising a cover plate, at least one hinge connecting an inner first edge of said cover plate to a floor of the aircraft, and a support linkage for supporting an outward second edge of said cover plate, said support linkage including a support section (10), a bracing section (13), a first journal (11) connecting said outward second edge of said cover plate to said support section, a second journal (15) connecting said bracing section to said cover plate, and a third journal (14) connecting said bracing section (13) to said support section (10), wherein a spacing is provided between said second journal (15) and said at least one hinge (4, 6), said spacing being just sufficient to permit folding said support linkage toward a back side of said cover plate when said cover plate is in a stowed position, and wherein said bracing section (13) of said support linkage comprises a knee bend (13A) along its length for bringing said second journal (15) closer to said hinge.

11. The device of claim 10, wherein said second journal is arranged between said at least one hinge and said outward edge of said cover plate.

* * * * *